United States Patent Office 3,215,691
Patented Nov. 2, 1965

3,215,691
11-(TERTIARYAMINOALKYL)-5,6-DIHYDRO-11H-BENZO[a]CARBAZOLES
Meier E. Freed, Philadelphia, Pa., Leonard M. Rice, Baltimore, Md., and Elisabeth Hertz, Bryn Mawr, Pa., assignors to American Home Products Corporation, New York, N.Y., a corporation of Delaware
No Drawing. Filed Jan. 24, 1962, Ser. No. 168,505
10 Claims. (Cl. 260—247.5)

This invention relates to novel substituted dihydrobenzocarbazole compounds having valuable central nervous system activities. More particularly, it relates to N-aminoalkyl-5,6-dihydro-11H-benzo[a]carbadoles and to their acid addition salts with pharmaceutically acceptable acids.

The compounds of this invention may be represented by the formula

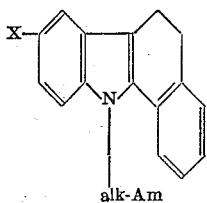

wherein X is hydrogen, chlorine, fluorine, methyl, methoxyl, nitro, or amino, alk represents an alkylene biradical containing from two to about six carbon atoms, and Am represents an amino radical containing no more than about eight carbon atoms. Preferably alk is an alkylene biradical containing from two to three carbon atoms, such as the ethylene radical, the trimethylene radical, or the propylene radical. Am is preferably a tertiary amino radical, in which cases it may be either a dialkylamino radical or a cyclic amino radical such as pyrrolidino, piperidino, morpholino, or N-alkylpiperazino.

The compounds of this invention have antidepressant action, are inhibitors of appetite (especially in combination with amphetamine or other phenethylamine derivatives), and are antihistamines. Additionally they exhibit ataractic or tranquilizing action and analgesic-like action. Being bases, the substituted dihydrobenzocarbazoles of this invention are preferably administered in the form of their acid addition salts. Suitable acids for forming these salts include hydrochloric, hydrobromic, sulfuric, phosphoric, citric, maleic, malic, propionic, acetic, fumaric, benzoic, succinic, and salicyclic acids.

The compounds of this invention, ordinarily in the form of their acid addition salts, may be administered either orally or parenterally after being combined with suitable solvents, diluents, fillers, flavoring agents, colors, pigments, etc.

The novel bases of this invention may in most cases be made conveniently by reaction of an 11-sodio-5,6-dihydro-11H-benzo[a]carbazole (prepared by treating a 5,6-dihydro-11H-benzo[a]carbazole in dimethylformamide solution with sodium hydride) with a suitable aminoalkyl halide, such as a bromide or chloride. Among aminoalkyl halides suitable for use in this invention may be mentioned 3-dimethylaminopropyl chloride, 3-dimethylaminoisobutyl chloride, 2-diethylaminoethyl bromide, 2-dimethylaminoethyl chloride, N-(2-chloroethyl)piperidine, 2-dimethylaminopropyl chloride, N-(2-chloroethyl)pyrrolidine, N-(3-chloropropyl)pyrrolidine, 3-dipropylaminopropyl chloride, 6-dimethylaminohexyl chloride, 2-dibutylaminoethyl bromide, N-methyl-N'-(3-chloropropyl)piperazine, and N-(3-chloropropyl)piperazine.

An alternative method of wide applicability for preparing certain compounds of this invention comprises reacting a 5,6-dihydrobenzo[a]carbazole (preferably in the form of its sodio derivative) with an alkylene dihalide, such as ethylene dichloride, ethylene dibromide, ethylene chlorobromide, trimethylene dibromide, trimethylene dichloride, trimethylene chlorobromide, tetramethylene dibromide, etc., to form an intermediate 11-(ω-haloalkyl)-5,6-dihydrobenzo[a]carbazole, and thereafter reacting said 11-(ω-haloalkyl)-5,6-dihydrobenzo[a]carbazole with ammonia, a primary amine, or a secondary amine to form an 11-(ω-aminoalkyl)-5,6-dihydrobenzo[a]carbazole; in this method it is ordinarily preferable to employ a secondary amine in the second reaction step so that the product is a tertiary amine.

Compounds of this invention substituted at the 8-position by chlorine, fluorine, methyl, methoxyl or nitro are preferably made by reaction of the corresponding 8-substituted 11-sodio-5,6-dihydro-11H-benzo[a]carbazole with a suitable haloalkylamine. Compounds of this invention in which there is an amino group at position 8 are preferably made by reduction of the corresponding 8-nitro compounds; this reduction can be effected either with stannous chloride or by hydrogenation catalyzed by palladium or nickel.

Other compounds of this invention, in which alk is the trimethylene radical and Am is primary amino, may be prepared by suitable reduction of an acrylonitrile-5,6-dihydro-11H-benzo[a]carbazole adduct, that is, an 11-cyanoethylated 5,6-dihydro-11H-benzo[a]carbazole. Compounds of the invention in which alk is trimethylene and Am is monoalkylamino may be made from such adducts by hydrolysis-esterification of the nitrile function, amidation of the resulting 3-aminopropionic ester with an alcoholic solution of the appropriate monoalkylamine, and finally lithium aluminum hydride reduction of the resulting monoalkylamide. By substituting methacrylonitrile for acrylonitrile, the corresponding series of 2-methyltrimethylene derivatives is obtained.

Compounds of this invention in which Am is a hydroxyalkylamino group, a bishydroxyalkylamino group, or an N-alkyl-N-hydroxyalkylamino group may be made by hydroxyalkylation of compounds of this invention in which Am is a primary amino radical or a secondary amino radical by means of a suitable alkylene oxide, alkylene halohydrin, or alkylene carbonate. Especially suitable hydroxyalkylating agents are ethylene oxide, ethylene chlorohydrin, and ethylene carbonate. Compounds of this invention wherein Am is a piperazino radical may be converted to compounds of the invention in which Am is a hydroxyethylpiperazino radical by treatment with ethylene oxide, ethylene chlorohydrin, or ethylene carbonate.

The following examples illustrates the practice of this invention.

*Example 1*

Eleven grams of 5,6-dihydro-11H-benzo[a]carbazole is added to a stirred suspension of 1.44 g. of sodium hydride in about 100 ml. of dimethylformamide. After stirring at 35–40° C. for about one hour, 6 g. of 3-dimethylaminopropyl chloride is added and the mixture is stirred overnight. The mixture is then cooled, poured into ice-water, acidified with dilute hydrochloric acid, and extracted with ether. The aqueous layer is made alkaline by addition of sodium hydroxide, causing separation of an oily product. This is extracted with ether, and the extract is washed with aqueous sodium chloride and dried over anhydrous sodium sulfate. The ether is evaporated and the residue crystallized from 90% ethanol. The product, 11-(3-dimethylaminopropyl)-5,6-dihydro-11H-benzo[a]carbazole, melts at 59–60° C.

Analysis:

|  | C | H | N |
|---|---|---|---|
| Calculated for $C_{21}H_{24}N_2$ | 82.80 | 7.95 | 9.22 |
| Found | 82.61 | 7.99 | 9.43 |

The hydrochloride salt, crystallized from acetone-methanol mixture, melts at 222–223° C.
Analysis:

|  | C | H | N | Cl |
|---|---|---|---|---|
| Calculated for $C_{21}H_{25}N_2Cl$ | 73.98 | 7.39 | 8.22 | 10.28 |
| Found | 73.70 | 7.33 | 8.26 | 10.27 |

Example 2

11 - (2 - piperidinoethyl) - 5,6 - dihydro - 11H - benzo[a]carbazole is prepared by essentially the same procedure as given in Example 1 from 5,6-dihydro-11H-benzo[a]carbazole and N-(2-chloroethyl)piperidine. The base melts at 91–92° C.
Analysis:

|  | C | H | N |
|---|---|---|---|
| Calculated for $C_{23}H_{26}N_2$ | 83.59 | 7.93 | 8.48 |
| Found | 83.42 | 7.91 | 8.39 |

The hydrochloride melts at 214–222° C.
Analysis:

|  | C | H | Cl | N |
|---|---|---|---|---|
| Calculated for $C_{23}H_{27}N_2Cl$ | 75.28 | 7.42 | 9.66 | 7.64 |
| Found | 75.11 | 7.28 | 9.65 | 7.64 |

The fumarate melts at 204–206° C.
Analysis:

|  | C | H | N |
|---|---|---|---|
| Calculated for $C_{27}H_{30}N_2O_4$ | 72.62 | 6.77 | 6.28 |
| Found | 72.63 | 6.88 | 6.31 |

Example 3

11 - (2 - dimethylaminoethyl) - 5,6 - dihydro - 11H-benzo[a]carbazole is prepared from 5,6-dihydro-11H-benzo[a]carbazole and 2-dimethylaminoethyl chloride, following the procedure of Example 1. The hydrochloride melts at 228–231° C.
Analysis:

|  | C | H | N | Cl |
|---|---|---|---|---|
| Calculated for $C_{20}H_{23}ClN_2$ | 73.49 | 7.09 | 8.57 | 10.85 |
| Found | 73.42 | 7.18 | 8.59 | 10.95 |

Example 4

11 - (2 - pyrrolidinoethyl) - 5,6 - dihydro - 11H - benzo[a]carbazole is made from 5,6-dihydro-11H-benzo[a]carbazole and N-(2-chloroethyl)pyrrolidine by following the procedure of Example 1. The base melts at 85.6–86.0° C.; the fumarate melts at 192.5–193° C.
Analysis:

|  | C | H | N |
|---|---|---|---|
| Calculated for $C_{26}H_{28}N_2O_4$ | 72.20 | 6.52 | 6.48 |
| Found | 72.35 | 6.70 | 6.32 |

Example 5

11 - (2 - diethylaminoethyl) - 5,6 - dihydro - 11H-benzo[a]carbazole is made by the procedure of Example 1 from 5,6-dihydro-11H-benzo[a]carbazole and 2-diethylaminoethyl chloride. The base boils at 168° C. at a pressure of 0.075 mm. The fumarate melts at 147–150° C.
Analysis:

|  | C | H | N |
|---|---|---|---|
| Calculated for $C_{26}H_{30}N_2O_4$ | 71.86 | 6.96 | 6.45 |
| Found | 71.79 | 7.05 | 6.51 |

Example 6

11 - (2 - dimethylaminopropyl) - 5,6 - dihydro - 11H-benzo[a]carbazole is made according to the method of Example 1 from 5,6-dihydro-11H-benzo[a]carbazole and 2-dimethylaminopropyl chloride. The fumarate melts at 159–162° C.
Analysis:

|  | C | H | N |
|---|---|---|---|
| Calculated for $C_{25}H_{28}N_2O_4$ | 71.40 | 6.71 | 6.66 |
| Found | 71.61 | 6.74 | 6.59 |

Example 7

11 - (2 - morpholinoethyl) - 5,6 - dihydro - 11H - benzo[a]carbazole is made according to the method of Example 1 from 5,6-dihydro-11H-benzo[a]carbazole and N-(2-chloroethyl)morpholine. This base melts at 122–123° C.
Analysis:

|  | C | H | N |
|---|---|---|---|
| Calculated for $C_{22}H_{24}N_2O$ | 79.48 | 7.28 | 8.43 |
| Found | 79.51 | 7.29 | 8.44 |

Example 8

11 - (3 - dipropylaminopropyl) - 5,6 - dihydro - 11H-benzo[a]carbazole is made according to the method of Example 1 from 5,6-dihydro-11H-benzo[a]carbazole and 3-dipropylaminopropyl chloride. The fumaric acid salt melts at 142–144° C. (dec.)
Analysis:

|  | C | H | N |
|---|---|---|---|
| Calculated for $C_{29}H_{36}N_2O_4$ | 73.08 | 7.61 | 5.88 |
| Found | 72.88 | 7.74 | 5.83 |

Example 9

11 - (6 - dimethylaminohexyl) - 5,6 - dihydro - 11H-benzo[a]carbazole is made according to the method of Example 1 from 5,6-dihydro-11H-benzo[a]carbazole and 6-dimethylaminohexyl chloride. The fumaric acid salt melts at 104–107° C.
Analysis:

|  | C | H | N |
|---|---|---|---|
| Calculated for $C_{28}H_{34}N_2O_4$ | 72.70 | 7.41 | 6.06 |
| Found | 72.70 | 7.70 | 6.07 |

Example 10

By the procedure of Example 1, 11-(3-diethylaminopropyl)-5,6-dihydro-11H-benzo[a]carbazole is prepared from 3-diethylaminopropyl chloride and 11-sodio-5,6-dihydro-11-H-benzo[a]carbazole.

Example 11

By the procedure of Example 1, 11-(6-diethylaminohexyl)-5,6-dihydro-11-H-benzo[a]carbazole is prepared

Example 12

By the procedure of Example 1, 11-(2-dibutylaminoethyl)-5,6-dihydro-11-H-benzo[a]carbazole is prepared from 2-dibutylaminoethyl chloride and 11-sodio-5,6-dihydro-11-H-benzo[a]carbazole.

Example 13

By the procedure of Example 1, 11-(3-[4-methylpiperazino]propyl)-5,6-dihydro-11-H-benzo[a]carbazole is prepared from 1-(3-chloropropyl)-4-methylpiperazine and 11-sodio-5,6-dihydro-11-H-benzo[a]carbazole.

Example 14

By the procedure of Example 1, 11-(3-piperazinopropyl) - 5,6 - dihydro-11-H-benzo[a]carbazole is prepared from γ-chloropropyl-piperazine and 11-sodio-5,6-dihydro-11-H-benzo[a]carbazole.

Example 15

By the procedure of Example 1, 11-(3-[4-hydroxyethylpiperazino]propyl) - 5,6 - dihydro-11-H-benzo[a]carbazole is prepared from 1-γ-chloropropyl-4-hydroxyethylpiperazine and 11-sodio-5,6-dihydro-11-H-benzo[a]carbazole.

Example 16

By the procedure of Example 1, 8 - chloro - 11 - (3-dimethylaminopropyl) - 5,6 - dihydro-11-H-benzo[a]carbazole is prepared from 8-chloro-11-sodio-5,6-dihydro-11-H-benzo[a]carbazole and γ-dimethylaminopropyl chloride.

Example 17

By the procedure of Example 1, 8-methyl-11-(3-dimethylaminopropyl) - 5,6 - dihydro-11-H-benzo[a]carbazole is prepared from 8-methyl-11-sodio-5,6-dihydro-11-H-benzo[a]carbazole and γ-dimethylaminopropyl chloride.

Example 18

By the procedure of Example 1, 8-nitro-11-(3-dimethylaminopropyl) - 5,6 - dihydro-11-H-benzo[a]carbazole is prepared from γ-dimethylaminopropyl chloride and 8-nitro-11-sodio-5,6-dihydro-11-H-benzo[a]carbazole.

Example 19

8 - amino - 11 - (3-dimethylaminopropyl)-5,6-dihydro-11-H-benzo[a]carbazole is prepared from 8-nitro-11-(3-dimethylaminopropyl) - 5,6-dihydro-11-H-benzo[a]carbazole by hydrogenation over palladium on charcoal.

Example 20

By the procedure of Example 1, 8-methoxy-11-(3-dimethylaminopropyl) - 5,6 - dihydro-11-H-benzo[a]carbazole is prepared from γ-dimethylaminopropyl chloride and 8-methoxy-11-sodio-5,6-dihydro-11-H-benzo[a]carbazole.

Example 21

11 - (3-aminopropyl)-5,6-dihydro-11-H-benzo[a]carbazole is prepared by reduction with lithium aluminum hydride of the corresponding 11-cyanoethyl compound obtained from cyanoethylation of 5,6-dihydro-11-H-benzo[a]carbazole.

Example 22

11 - (3 - methylaminopropyl) - 5,6 - dihydro - 11 - H-benzo[a]carbazole is prepared by reduction with lithium aluminum hydride of the N-methyl amide obtained from methylamine and the methyl ester of 5,6-dihydro-11-H-benzo[a]carbazole-11-propionic acid.

Example 23

By the procedure of Example 1, 11-(3-dimethylamino-2 - methyl-propyl)-5,6-dihydro-11-H-benzo[a]carbazole is prepared from 3-dimethylamino-2-methylpropyl chloride and 11-sodio-5,6-dihydro-11-H-benzo[a]carbazole.

We claim:

1. A substance selected from the group consisting of compounds having the formula

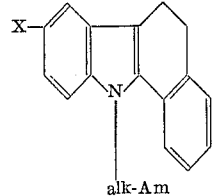

wherein X is a member of the group consisting of hydrogen, chlorine, fluorine, methyl, methoxy, nitro, and amino, alk represents alkylene having a carbon chain of from two to six atoms between its points of attachment, and Am represents an amino substituent of no more than eight carbon atoms selected from the group consisting of primary amino, lower alkylamino, diloweralkylamino, morpholino, pyrrolidino, piperidino, piperazino, methylpiperazino, and hydroxyethylpiperazino, and the non-toxic acid addition salts of these compounds with pharmaceutically acceptable acids.

2. 11 - (3 - dimethylaminopropyl) - 5,6 - dihydro-11H-benzo[a]carbazole.

3. 11 - (2 - piperidinoethyl) - 5,6 - dihydro - 11H-benzo[a]carbazole.

4. 11 - (2 - dimethylaminoethyl) - 5,6 - dihydro - 11H-benzo[a]carbazole.

5. 11 - (2 - pyrrolidinoethyl) - 5,6 - dihydro - 11H-benzo[a]carbazole.

6. 11 - (2 - diethylaminoethyl) - 5,6 - dihydro - 11H-benzo[a]carbazole.

7. 11 - (2 - dimethylaminopropyl) - 5,6 - dihydro-11H-benzo[a]carbazole.

8. 11 - (2 - morpholinoethyl) - 5,6 - dihydro - 11H-benzo[a]carbazole.

9. 11 - (3-dipropylaminopropyl) - 5,6 - dihydro - 11H-benzo[a]carbazole.

10. 11 - (6 - dimethylaminohexyl) - 5,6 - dihydro-11H-benzo[a]carbazole.

No references cited.

NICHOLAS S. RIZZO, *Primary Examiner.*

DUVAL T. McCUTCHEN, WALTER A. MODANCE,
*Examiners.*